US012498149B2

(12) United States Patent
Suzuki et al.

(10) Patent No.: US 12,498,149 B2
(45) Date of Patent: Dec. 16, 2025

(54) MOTOR, COMPRESSOR AND AIR CONDITIONER

(71) Applicant: AICHI ELECTRIC CO., LTD., Kasugai (JP)

(72) Inventors: Yudai Suzuki, Kasugai (JP); Shoji Mano, Kasugai (JP)

(73) Assignee: AICHI ELECTRIC CO., LTD., Kasugai (JP)

( * ) Notice: Subject to any disclaimer, the term of this patent is extended or adjusted under 35 U.S.C. 154(b) by 0 days.

(21) Appl. No.: 18/830,753

(22) Filed: Sep. 11, 2024

(65) Prior Publication Data
US 2025/0172322 A1    May 29, 2025

(30) Foreign Application Priority Data

Nov. 27, 2023   (JP) .................. 2023-199886

(51) Int. Cl.
  *F25B 31/02*   (2006.01)
  *F04C 18/02*   (2006.01)
  *F04C 23/02*   (2006.01)

(52) U.S. Cl.
  CPC ........ *F25B 31/026* (2013.01); *F04C 18/0215* (2013.01); *F04C 23/02* (2013.01); *F04C 2240/40* (2013.01); *F04C 2240/809* (2013.01)

(58) Field of Classification Search
  CPC ...... F25B 31/025; F25B 1/04; F04C 18/0215; F04C 23/02; F04C 23/008; F04C 29/00; F04C 2240/40; F04C 2240/809; F04C 2240/30; F04C 2240/10; F04C 2240/20
  See application file for complete search history.

(56) References Cited

U.S. PATENT DOCUMENTS

| | | | | |
|---|---|---|---|---|
| 8,432,082 B2* | 4/2013 | Fukunaga | ............. | H02K 3/325 |
| | | | | 310/214 |
| 10,630,136 B2* | 4/2020 | Ishizaki | .................. | H02K 1/16 |
| 2007/0200450 A1* | 8/2007 | Yukitake | ............. | H02K 15/022 |
| | | | | 310/194 |
| 2015/0354567 A1* | 12/2015 | Lin | ..................... | F04C 29/0085 |
| | | | | 417/410.5 |
| 2018/0017296 A1* | 1/2018 | Heger | .................. | F25B 31/008 |
| 2019/0234406 A1* | 8/2019 | Homma | ............... | H02K 1/2791 |

FOREIGN PATENT DOCUMENTS

JP    2009144581 A    7/2009

* cited by examiner

*Primary Examiner* — Dapinder Singh
(74) *Attorney, Agent, or Firm* — J-TEK LAW PLLC; Jeffrey D. Tekanic; Scott T. Wakeman

(57) ABSTRACT

A compressor (100) includes a compression mechanism part (120) and a motor (200) that are housed in a closed container (110). A stator (300) of the motor (200) includes stator coils (340) respectively wound around teeth of a stator core (310). Each of the stator coils (340) includes first and second protruding portions (340A, 340B) that respectively protrude from the stator core (310) toward first and second sides in an axial direction. First and second surrounding walls (350, 360) are respectively disposed around outer circumferential sides of the first and second protruding portions (340A, 340B) and extend continuously in the axial direction and a circumferential direction so as to surround the entire outer circumferential sides of the first and second protruding portions (340A, 340B).

20 Claims, 10 Drawing Sheets

MOTOR, COMPRESSOR AND AIR CONDITIONER

CROSS-REFERENCE

The present application claims priority to Japanese patent application serial number JP 2023-199886 filed on Nov. 27, 2023, the contents of which are incorporated fully herein by reference.

TECHNICAL FIELD

The present disclosure relates to a motor that can be used, e.g., in a compressor and/or an air conditioner.

BACKGROUND

Compressors (which may also be referred to as an "electric compressor" herein) having a compression mechanism part and a motor for driving the compression mechanism part are commonly used in air conditioners for adjusting the temperature and humidity of indoor air.

In addition to the compression mechanism part and the motor for driving the compression mechanism part, a typical compressor also includes a closed container that houses the compression mechanism part and the motor. The motor has a stator and a rotor. The stator includes a stator core, and the rotor includes a rotor core. The motor is housed in the closed container such that an outer peripheral surface of the stator core is in contact with an inner peripheral surface of the closed container.

A compressor in which the compression mechanism part and the motor are arranged one above the other in a vertical direction is known as a vertical compressor. For example, vertical compressors in which the motor is arranged above the compression mechanism part are known.

In such a vertical compressor, a refrigerant (cooling medium, coolant), which is suctioned via an inlet port, is compressed in (by) the compression mechanism part. The refrigerant compressed in (by) the compression mechanism part flows through a gap (clearance) between an inner peripheral surface of the stator core and an outer peripheral surface of the rotor core and (separate, distinct) refrigerant passages formed in the motor, and is then discharged from (via) an outlet port. Stator passages are typically used as the refrigerant passages. The stator passages include at least either of first stator passages formed between the outer peripheral surface of the stator core and the inner peripheral surface of the closed container and second stator passages formed in the stator core. Typically, each of the first stator passages is defined by a cutout surface formed by cutting out an outer peripheral surface of the stator core and the inner peripheral surface of the closed container. Rotor passages formed in the rotor core may, in addition or instead, be used as the refrigerant passages.

An oil sump is provided below the compression mechanism part to store lubricating oil for lubricating sliding parts of the compression mechanism part. Thus, a mixed gas containing the compressed refrigerant and atomized particles of the lubricating oil is discharged from the outlet port.

In such an embodiment, the lubricating oil is separated from the mixed gas by contacting a wall that defines the refrigerant passage or the inner peripheral surface of the closed container. The lubricating oil separated from the mixed gas drops through the refrigerant passage or the gap and returns to the oil sump. Thus, the amount of lubricating oil that is contained (entrained) in the mixed gas discharged from the outlet port is reduced. That is, the amount of lubricating oil stored in the oil sump provided in the closed container remains approximately constant during operation of the compressor.

In addition, an accumulator is provided to keep the amount of lubricating oil stored in the oil sump approximately constant. The accumulator separates any remaining lubricating oil entrained in the mixed gas after the mixed gas has been discharged from the outlet port. The lubricating oil separated from the mixed gas by the accumulator is returned to the oil sump.

A technique for increasing the amount of lubricating oil separated from the mixed gas within the closed container is disclosed, for example, in JP 2009-144581 A.

JP 2009-144581 A discloses a technique of providing an oil separator above the stator core such that the mixed gas that has passed through the refrigerant passage hits on the oil separator. When the mixed gas hits on the oil separator, the flow velocity of the mixed gas is reduced so that lubricating oil is separated from the mixed gas. The lubricating oil separated from the mixed gas by the oil separator drops through the refrigerant passage and returns to the oil sump.

SUMMARY OF THE INVENTION

Recently, it has become more desirable to reduce the size of compressors for air conditioners. Accordingly, it is also desirable to reduce the size of motors for such compressors. To reduce the size of the motor, a stator core forming a stator and a rotor core forming a rotor must also be reduced in size. However, if stator passages and/or rotor passages are provided in such a motor that has been reduced in size, the path(s) through which magnetic flux flow (referred to as "magnetic paths") is/are narrowed, so that the efficiency of the smaller motor is decreased as compared to larger motors.

To overcome this problem, it might be conceivable to define each of first stator passages by forming a recessed surface on (in) a closed container inner peripheral surface and a stator core outer peripheral surface, instead of by forming a cutout surface on (in) a stator core outer peripheral surface and the closed container inner peripheral surface, in order to prevent the magnetic paths from being narrowed. In this method, however, the outer diameter of the closed container must be increased, thereby increasing the overall size of the compressor.

In the alternative, it might be conceivable to omit the refrigerant passages (stator passages, rotor passages) through the motor or to reduce the cross-sectional area of the refrigerant passages, in order to reduce the size of the motor without preventing the magnetic paths from being narrowed. In this case, the amount of lubricating oil separated from the mixed gas within the closed container and (directly) returned to the oil sump (e.g., via the narrowed refrigerant passages) is reduced. Thus, if the refrigerant passages are omitted or the cross-sectional area of the refrigerant passages are reduced, then the amount of lubricating oil that is entrained in mixed gas and subsequently returned to the oil sump significantly depends on the amount of lubricating oil that is returned from an accumulator, because less lubricating oil is separated from the mixed gas within the closed container prior to the mixed gas being exhausted through the outlet port of the compressor.

Stator coils respectively wound around teeth of the stator core include first and second protruding portions that respectively protrude axially upward and downward from (outside) the stator core. Each of the first and second protruding portions of the stator coils includes spaces passing (extending) therethrough in a radial direction at intervals along a circumferential direction. The flow of the mixed gas in the axial direction is disturbed by the presence of the spaces extending in the radial direction in the first and second protruding portions. For example, a portion of the mixed gas after flowing through the gap between the stator core inner peripheral surface and the rotor core outer peripheral surface flows through the spaces in the radial direction. Thus, the amount of the lubricating oil that is contained in the mixed gas discharged from the outlet port is decreased. That is, the amount of lubricating oil returned from an accumulator is decreased.

Accordingly, it is one non-limiting object of the present disclosure to reduce the influence (effect) of the spaces extending in the radial direction that are present in the axially protruding portion(s) of the stator coils.

A first aspect of the present disclosure relates to a motor configured to be used in a compressor, which may be used, e.g., in an air conditioner.

The motor includes a rotor and a stator. The stator includes a stator core and stator coils.

The stator core has a tubular shape extending in an axial direction. The stator core has a yoke extending in a circumferential direction and teeth arranged spaced apart from each other in the circumferential direction and extending radially inward (toward the rotational axis of the rotor) from the yoke.

The stator coils are respectively wound around the teeth. Each of the stator coils includes first and second protruding portions that respectively protrude from (outside) the stator core toward first and second sides in the axial direction.

Furthermore, at least one surrounding wall is provided. The at least one surrounding wall is arranged on (disposed around) an outer circumferential side of one of the first and second protruding portions and extends continuously in the axial direction and the circumferential direction so as to surround the entire outer side of the one of the first and second protruding portions.

Radially outer sides of spaces extending in the radial direction, which are present in the at least one protruding portion, are closed or blocked by the at least one surrounding wall. Thus, the influence (negative effect) of such spaces can be reduced or limited. Furthermore, electric components arranged in the vicinity of the at least one protruding portion can be prevented (blocked) from coming into contact with the at least one protruding portion.

Thus, in the motor of the above described first aspect, the influence (negative effect) of the radially extending spaces present in the axially protruding portion of the stator coil can be reduced or limited.

In another aspect of the above-described motor, the stator includes a first electrical insulator assembly and a second electrical insulator assembly.

The first electrical insulator assembly has a first outer wall part that extends in the axial direction and the circumferential direction, and first body parts that are arranged spaced apart from each other in the circumferential direction and extend radially inward from the first outer wall part. The first electrical insulator assembly is arranged (disposed) on the first side of the stator core in the axial direction such that the first outer wall part faces the yoke and the first body parts respectively face the teeth.

The second electrical insulator assembly has a second outer wall part that extends in the axial direction and the circumferential direction, and second body parts that are arranged spaced apart from each other in the circumferential direction and extend radially inward from the second outer wall part. The second electrical insulator assembly is arranged (disposed) on the second side of the stator core in the axial direction such that the second outer wall part faces the yoke and the second body parts respectively face the teeth.

The stator coils are respectively wound around the teeth in a state in which the first and second body parts are respectively arranged on the first and second sides of the teeth in the axial direction.

At least one of the first outer wall part of the first electrical insulator assembly and the second outer wall part of the second electrical insulator assembly has at least one notch that opens at (extends between) an outer wall outer peripheral surface and an outer wall inner peripheral surface.

The at least one surrounding wall is arranged on (disposed around) an outer (circumferential) side of at least one of the first and second outer wall parts.

In this aspect as well, the influence (negative effect) of the spaces extending in the radial direction that are present in the axially protruding portion(s) of the stator coil(s) can also be reduced or limited.

In another aspect of the above-described motor, the at least one surrounding wall is formed as an annular member composed of a heat shrinkable polymer (resin).

In this aspect, the surrounding wall(s) can be easily and reliably provided.

A second aspect of the present disclosure relates to a compressor having a motor according to any one of the preceding aspects.

More specifically, the compressor includes a compression mechanism part, an above-described motor that drives the compression mechanism part, and a closed container. The compression mechanism part and the motor are housed within the closed container. The closed container has an inlet port and an outlet port. An oil sump is provided within the closed container to store lubricating oil. The compressor is configured such that a refrigerant suctioned via the inlet port is compressed by the compression mechanism part and discharged from the outlet port.

Such a compressor has the same effects and advantages as the above-described motors.

In another aspect of such a compressor, the motor is arranged such that the axial direction of the motor is parallel (including "substantially parallel") to the vertical direction. The motor and the compression mechanism part are arranged such that one of the motor and the compression mechanism part is disposed above the other in the vertical direction. The oil sump is provided below the compression mechanism part.

In this aspect, the compressor can be configured as a vertical compressor.

In another aspect of such a compressor, the motor is arranged above the compression mechanism part. The oil sump is provided below the compression mechanism part. The first protruding portion protrudes upward from the stator core. The second protruding portion protrudes downward from the stator core.

The at least one surrounding wall is provided (disposed) on (around) an outer circumferential side of at least the first protruding portion.

In this aspect, the compressor can be configured as a vertical compressor in which the motor is arranged above the compression mechanism part.

In another aspect of such a compressor, the surrounding wall(s) is (are) formed (each) as an annular member composed of a heat shrinkable polymer (resin).

In this aspect, the surrounding wall(s) can be easily and reliably provided.

A third aspect of the present disclosure relates to an air conditioner having any one of the above-described compressors.

Such an air conditioner has the same effects and advantages as the above-described motors and the above-described compressors.

By using a motor, a compressor and/or an air conditioner according to the present disclosure, the influence (negative effect) of spaces extending in the radial direction that are present in the protruding portions of the stator coils, which protrudes in the axial direction from the stator core, can be reduced or limited.

DETAILED DESCRIPTION OF THE EMBODIMENTS

Representative embodiments of the present disclosure will be described with reference to the drawings.

In this description, the term "axial direction" refers to an extending direction of an axis P. The axis P corresponds to a rotational axis (center line of a rotor (a rotary shaft) when the rotor is arranged to be rotatable relative to a stator.

The term "circumferential direction" refers to a circumferential direction around the axis P.

The term "radial direction" refers to an extending direction of a line passing perpendicularly through the axis P as viewed from one side in the extending direction of the axis P. The terms "inner side (inside, inward) in the radial direction" and "radially inward" refer to the axis P side in the radial direction and the terms "outer side (outside, outward) in the radial direction" and "radially outward" refer to the opposite side to the axis P in the radial direction.

As for electrical insulator assemblies (a first electrical insulator assembly, a second electrical insulator assembly) and surrounding walls (a first surrounding wall, a second surrounding wall), the terms "axial direction", "circumferential direction" and "radial direction" respectively refer to the "axial direction", "circumferential direction" and "radial direction" in the state in which each of them is mounted on the stator core.

Figure 1:
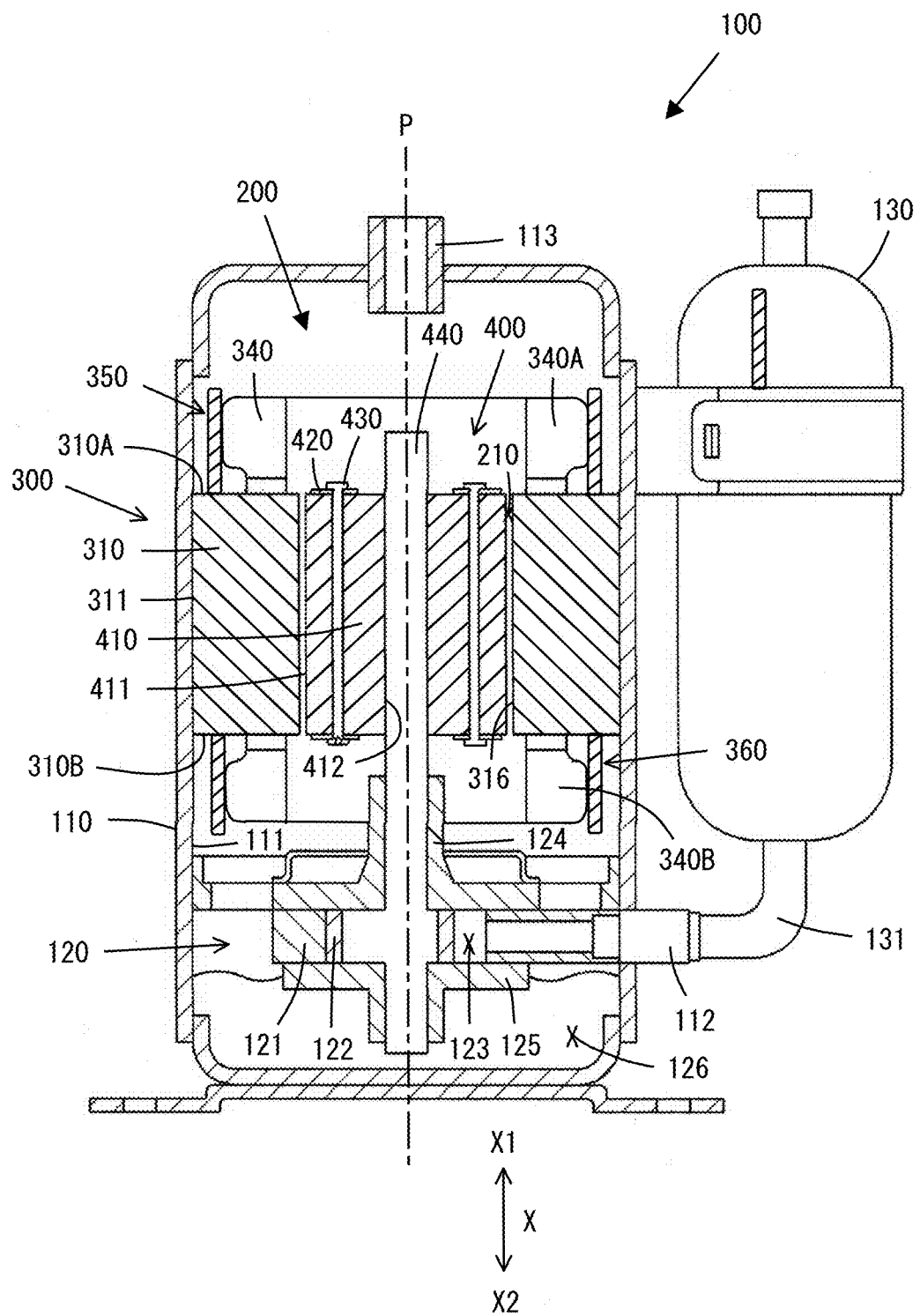
FIG. 1 is a cross-sectional view through a compressor of a first embodiment.

A first embodiment of a compressor according to this disclosure will be described with reference to FIG. 1. FIG. 1 is a cross-sectional view through a compressor 100 of the first embodiment.

The compressor 100 of the first embodiment includes a motor (electric motor) 200 that serves as a first non-limiting embodiment of a motor according to the present disclosure.

The compressor 100 includes a closed container (outer casing, outer housing) 110, a compression mechanism part (compressor mechanism) 120, an accumulator (storage tank) 130 and the motor 200.

The closed container 110 has a closed container inner peripheral surface 111. A closed container inner (interior) space is defined by the closed container inner peripheral surface 111.

The compression mechanism part 120 and the motor 200 are housed in the closed container inner space. The compressor 100 of this embodiment is configured as a vertical compressor in which one of the compression mechanism part 120 and the motor 200 is arranged above the other in a vertical direction. In the present embodiment, the compressor 100 is configured as a vertical compressor in which the motor 200 is arranged above the compression mechanism part 120. However, in alternative embodiments according to the present disclosure, the vertical compressor may be configured such that the motor 200 is arranged below the compression mechanism part 120.

In the closed container 110, an inlet port 112 is provided below the motor 200 and an outlet port 113 is provided above the motor 200. An oil sump 126 is provided in (defined by) a bottom part (below the compression mechanism part 120) of the closed container 110 to store lubricating oil to be supplied to sliding parts (including bearings 124, 125) of the compression mechanism part 120.

The compression mechanism part 120 compresses a refrigerant that transfers heat energy. In this embodiment, a natural refrigerant having a low global warming potential (GWP), in particular, non-toxic and non-combustible carbon dioxide, is used as the refrigerant. Of course, various refrigerants other than carbon dioxide may instead be used. When carbon dioxide is used as the refrigerant, the temperature and pressure inside the closed container 110 can become higher than when a fluorocarbon refrigerant is used. Accordingly, a lubricating oil having a higher viscosity is preferably used as the lubricating oil when carbon dioxide is used as the refrigerant.

In this embodiment, a rotary-type compression mechanism part is used as the compression mechanism part 120. That is, the compression mechanism part includes a structure that is rotated to generate compressed (pressurized) refrigerant, such as a rotary screw, a rotary vane, a rolling piston, an eccentrically moving scroll, etc. Of course, compression mechanism parts composed of various other types of structures may be used, such as reciprocating (piston-cylinder), centrifugal (impeller) or axial (air foil) compression mechanisms.

In this embodiment, the compression mechanism part 120 includes a cylinder 121, an eccentric rotor 122 that is rotated by a rotary shaft 440, and a compression chamber 123. The rotary shaft 440 is rotatably supported by bearings 124, 125.

When the eccentric rotor 122 of the compression mechanism part 120 is rotated by the rotary shaft 440, refrigerant suctioned from the inlet port 112 is compressed (pressurized) within the compression chamber 123.

The refrigerant compressed in the compression mechanism part 120 mixes with atomized lubricating oil. Therefore, a mixed gas (gas mixture) that contains the compressed refrigerant and the atomized lubricating oil flows (upwardly) through a gap (clearance, annular passage) 210 between a stator 300 and a rotor 400 and is discharged from an outlet port 113.

The mixed gas, preferably after passing through an air conditioning unit (in particular, an evaporator), is returned to the accumulator 130 where lubricating oil is separated from the mixed gas. The refrigerant separated from the mixed gas by the accumulator 130 is returned to the compression mechanism part 120 via a suction pipe 131 and the inlet port 112. The lubricating oil separated from the mixed gas by the accumulator 130 is returned to the oil sump 126 (via a not shown conduit).

The lubricating oil stored in the oil sump 126 is conveyed to sliding parts of the compression mechanism part 120 when the rotary shaft 440 rotates. Although much of the lubricating oil is directly returned to the oil sump 126 after lubricating the sliding parts of the compression mechanism part 120 (i.e. without passing through the gap 210), a small portion of the lubricating oil becomes entrained in the compressed refrigerant that flows through the gap 210 to the outlet port 113.

After the mixed gas flows through the gap 210 of the motor 200 to above the motor 200, it is cooled by contacting the closed container inner peripheral surface 111. As the mixed gas cools, some of the entrained lubricating oil separates (precipitates) from the mixed gas. Thereafter, some of the lubricating oil, which has separated from the mixed gas, flows downward (drops) through the gap 210 of the motor 200 and returns to the oil sump 126. The rest of the separated lubricating oil adheres to the closed container inner peripheral surface 111.

Figure 2:
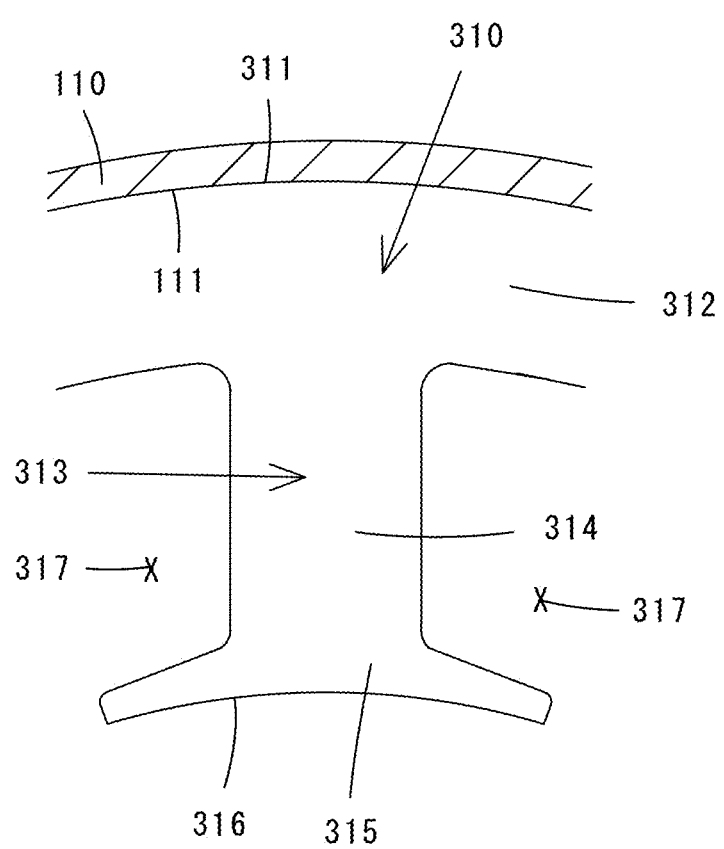
FIG. 2 is an enlarged view of portion of a stator contained in a motor of the first embodiment.
Figure 3:
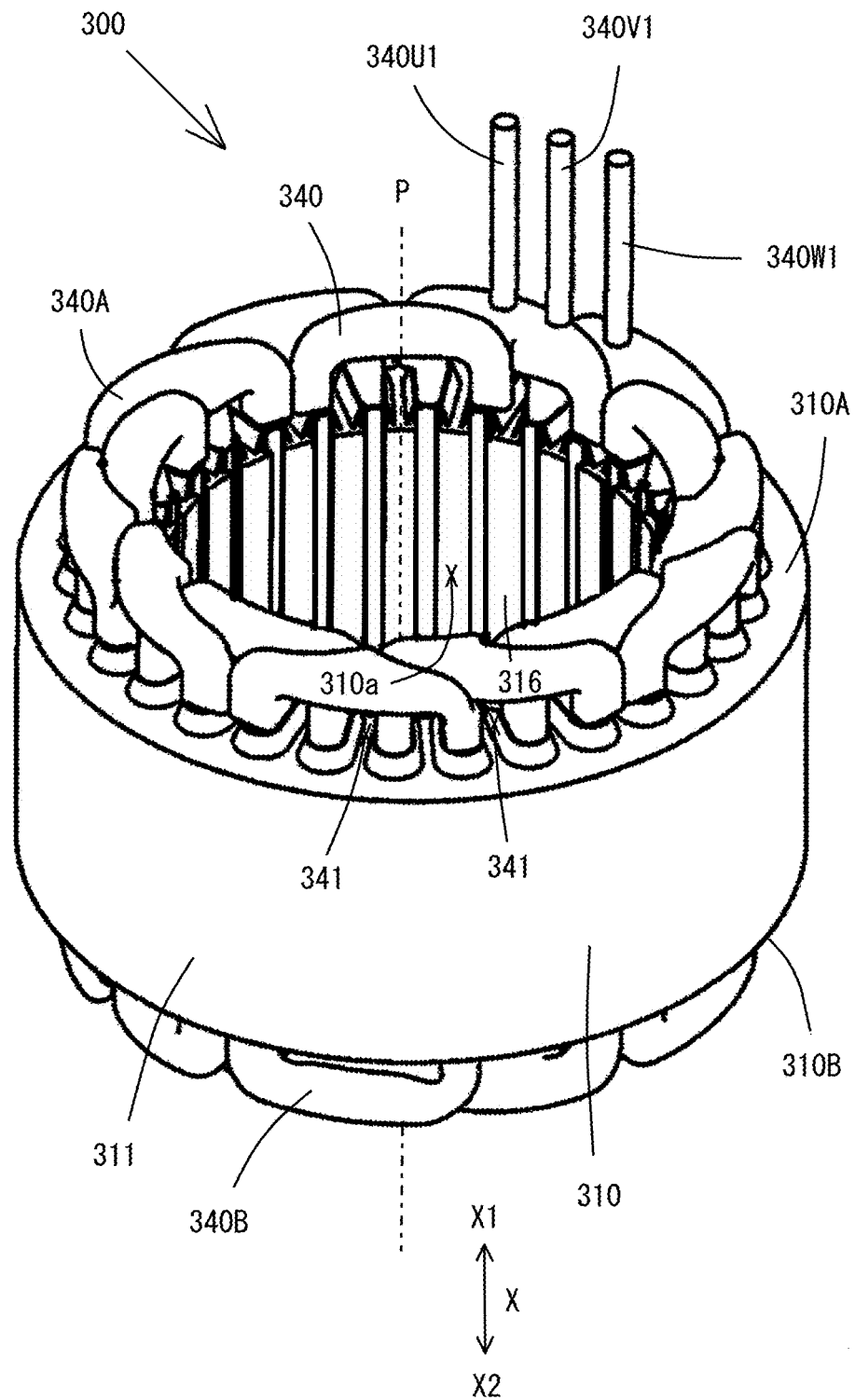
FIG. 3 is a perspective view of the stator of the first embodiment.
Figure 4:
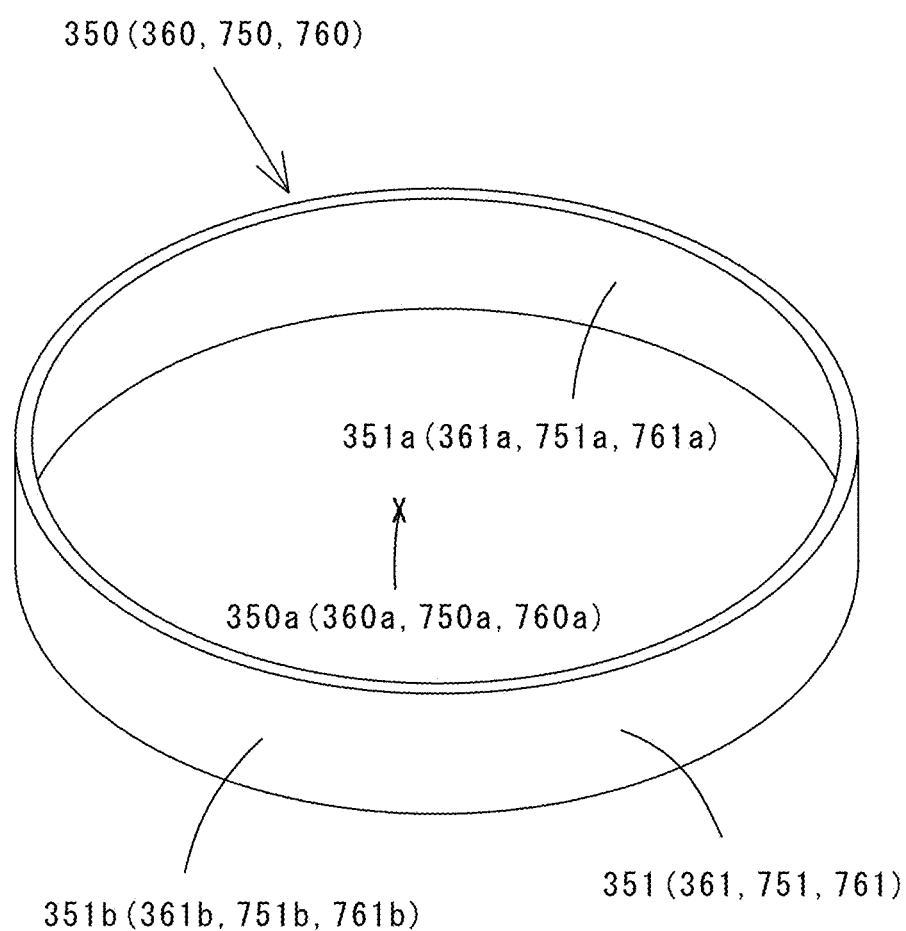
FIG. 4 is a perspective view of a surrounding wall that is provided on the stator of the first embodiment.
Figure 5:
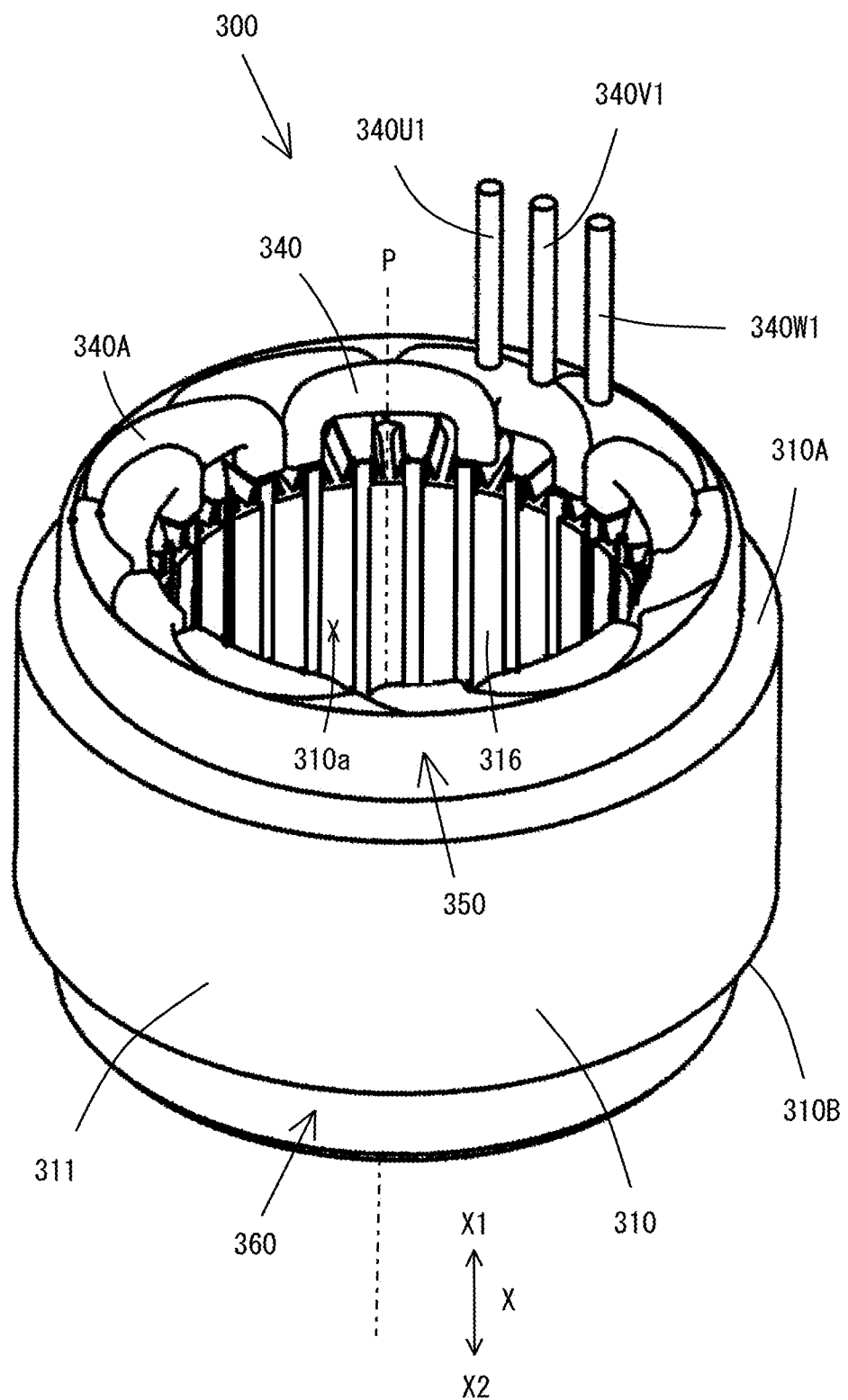
FIG. 5 is another perspective view of the stator of the first embodiment that shows the surrounding wall of FIG. 4 mounted thereon.

Next, the structure of the motor 200 will be described with reference to FIGS. 2 to 5. FIG. 2 is an enlarged view of a portion of the stator 300 that constitutes a part of the motor 200. FIG. 3 is a perspective view of the stator 300 in a state in which first and second surrounding walls 350, 360 (see below) have been omitted. FIG. 4 is a perspective view of the first surrounding wall 350; the second surrounding wall 360 has the same structure. FIG. 5 is a perspective view of the stator 300 in a state in which the first and second surrounding walls 350, 360 are arranged above and below a stator core 310 of the stator 300, respectively.

The motor 200 of this embodiment is a permanent magnet motor in which permanent magnets are respectively inserted in magnet insertion holes formed in the rotor 400.

Thus, the motor 200 is basically constituted by the stator 300 and the rotor 400.

The stator 300 includes the stator core 310 and a plurality of stator coils 340.

The stator core 310 is constituted as a laminated body that is formed by laminating electromagnetic steel sheets. The stator core 310 has a tubular shape extending in an axial direction (X direction) and has a stator core outer peripheral surface 311 and a stator core inner peripheral surface 316. The stator core inner peripheral surface 316 defines a stator core inner space 310*a* with the (central, rotational) axis P as its center line. The rotor 400 (a rotor core 410) is rotatably disposed within the stator core inner space 310*a*. In this embodiment, the stator core 310 is arranged such that the axial direction (X direction) is parallel (including substantially "parallel") to the vertical direction. The rotor 400 rotates about the axis P.

The stator core 310 has a stator core end surface 310A on a first side (X1 side) (upper side in this embodiment) in the axial direction, and a stator core end surface 310B on a second side (X2 side) (lower side in this embodiment) in the axial direction.

The stator core 310 has a yoke 312 and teeth 313 as shown in FIG. 2 when viewed from one side in the axial direction.

The yoke 312 extends (continuously) in the circumferential direction. The teeth 313 are arranged spaced apart from each other in the circumferential direction and extend radially inward (toward the axis P) from the yoke 312. Each of the teeth 313 has a tooth base part 314 and a tooth tip part 315. The tooth base part 314 extends radially inward from the yoke 312. The tooth tip part 315 is formed on a tip end on the radially inner side (the axis P side) of the tooth base part 314 and extends in the circumferential direction. The tooth tip part 315 has a tooth tip surface 316 on the radially inner side. The tooth tip surfaces 316 collectively define a stator core inner space in which the rotor 400 (the rotor core 410) is disposed. That is, the tooth tip surfaces 316 form the stator core inner peripheral surface.

Each pair of teeth 313 that are adjacent to each other in the circumferential direction defines a slot 317.

In this embodiment, the stator core 310 is disposed in the closed container inner space with the stator core outer peripheral surface 311 in contact with the closed container inner peripheral surface 111.

The stator coils 340 are respectively wound around the teeth 313. In this embodiment, the stator coils 340 are wound around the teeth 313 according to a distributed winding method.

Each stator coil 340 includes inserted or embedded portions, which are inserted into (disposed within) the slots 317 on both sides of one of each tooth base part 314, and first and second protruding portions 340A, 340B that protrude from (outside) the stator core 310 above and below, as can be seen in FIG. 3. More specifically, the first protruding portion 340A protrudes from the stator core 310 toward the first side (in the direction of arrow X1, upward) in the axial direction. The second protruding portion 340B protrudes from the stator core 310 toward the second side (in the direction of arrow X2, downward) in the axial direction.

Furthermore, end portions of the lead wires forming the respective stator coil(s) of each phase are drawn (extend) out of the stator core 310 and serve as power supply connection terminals. For example, end portions of lead wires forming one or more U-phase stator coils, one or more V-phase stator coils and one or more W-phase stator coils are respectively drawn (extend) out as power supply connection terminals 340U1, 340V1, 340W1, respectively.

Referring back to FIG. 1, the rotor 400 includes the rotor core 410 and the rotary shaft 440.

The rotor core 410 is also composed of a laminated body that is formed by laminating electromagnetic steel sheets. The rotor core 410 has a tubular shape extending in the axial direction (X direction) and has a rotor core outer peripheral surface 411 and a rotor core inner peripheral surface 412. The rotor core inner peripheral surface 412 defines a rotor core inner space.

The rotary shaft 440 is inserted into (fitted in) the rotor core inner space, for example, by press fitting (i.e. as a force fit or friction fit).

The rotor core 410 is rotatably disposed within the stator core inner space 310*a* such that the center line of the rotary shaft 440 coincides (or including "substantially coincides") with the axis P.

The gap (clearance, annular passage) 210 is formed between the stator core inner peripheral surface (tooth tip surfaces) 316 and the rotor core outer peripheral surface 411 when the rotor core 410 is arranged within the stator core inner space 310*a*. The gap (clearance) 210 is an annular gap that extends circumferentially around the axis P and also extends in the axial direction through the motor 200.

An end plate 420 is arranged on each side of the laminated electromagnetic steel sheets in the axial direction. Caulking pins 430 are respectively inserted through caulking pin insertion holes formed in each of the electromagnetic steel sheets and the end plates 420, so that the laminated body is fixed while the electromagnetic steel sheets are aligned.

As was indicated above, the rotor core 410 has magnet insertion holes (not shown) in which permanent magnets (not shown) are respectively inserted. The number and shape of the magnet insertion holes and the permanent magnets (i.e. the number of poles of the motor 200) can be determined appropriately depending on the application of the present teachings.

As shown in FIG. 3, the first and second protruding portions 340A, 340B of the stator coils 340 define (create, form) spaces 341 that pass through in the radial direction (i.e. radially-extending spaces or gaps) at intervals along the circumferential direction. Each of the spaces 341 is defined as a space in which no lead wire forming one of the stator coils 340 exists. That is, when the stator coils 340 (specifically, lead wires respectively forming the stator coils 340) are respectively wound around each of the teeth 313, the spaces 341, which pass through in the radial direction and in which no lead wire exist, are formed on the first and second sides of the stator core 310 in the axial direction.

Therefore, the flow of mixed gas in the axial direction through the gap 210 of the motor 200 is disturbed by the spaces 341 present in the first and second protruding portions 340A, 340B. For example, when a portion of the mixed gas flows through the spaces 341 of the (lower) second protruding portion 340B, the amount of the mixed gas, which contains atomized lubricating oil, flowing into (through) the gap 210 of the motor 200 is decreased by the amount of the mixed gas that has passed through the spaces 341 of the second protruding portion 340B. Furthermore, when a portion of the mixed gas flows through the spaces 341 of the (upper) first protruding portion 340A, the amount (or flow rate) of the mixed gas, which contains atomized lubricating oil, flowing from (out of) the gap 210 of the motor 200 toward the outlet port 113 (the amount of the lubricating oil contained in the mixed gas discharged from the outlet port 113) is decreased by the amount of the mixed gas that has passed through the spaces 341 of the first protruding portion 340A.

In this embodiment, in order to limit the negative influence or effect (in particular, disturbance of the flow of the mixed gas) of the spaces 341 in the first and second protruding portions 340A, 340B, first and second surrounding walls 350, 360 are respectively provided on (around) the outer circumferential sides of the first and second protruding portions 340A, 340B.

The structure of the first surrounding wall 350 will now be described with reference to FIG. 4.

The first surrounding wall 350 is formed as an annular member 351 that is configured (sized) to surround the entire outer circumferential side of the first protruding portion 340A.

The annular member 351 extends continuously in the circumferential direction around a central point 350*a* and also extends in the axial direction. Here, it is noted that the length of the first surrounding wall 350 in the axial direction is preferably equal to or greater than the length of the first protruding portion 340A in the axial direction, so that the first surrounding wall 350 extends above (beyond) the first protruding portion 340A in the axial direction. The annular member 351 has an annular member inner peripheral surface 351*a* and an annular member outer peripheral surface 351*b*.

The annular member 351 is formed of a material having insulating properties, in particular electrical insulating properties. Various known materials can be used as the material having insulating properties that forms the annular member 351. Various methods can be used to arrange (mount, install) the annular member 351 on the outer circumferential side of the first protruding portion 340A.

In this embodiment, the annular member 351 is formed as a polymeric (resin) annular member formed from a heat shrinkable resin (polymer) that shrinks when heated. Various known resins (polymers) can be used as the heat shrinkable resin that forms a heat shrinkable polymeric annular member 351. The thickness of the annular member 351 is preferably set within a range of 0.07 mm to 0.50 mm.

In this embodiment, the annular member 351 is heated in the state in which it is arranged (disposed) around the outer circumferential side of the first protruding portion 340A. The annular member 351 shrinks upon being heated. By shrinking the annular member 351, the annular member 351 becomes adhered (tightly fitted, comes into close contact) to the entire outer circumferential side of the first protruding portion 340A. Thus, the annular member 351 (the first surrounding wall 350) is easily and firmly arranged (mounted, installed) on the outer circumferential side of the first protruding portion 340A.

When the annular member 351 has been adhered to (around) the entire outer circumferential side of the first protruding portion 340A, the radial outer sides of the spaces 341 present in the first protruding portion 340A are closed or blocked thereby.

By closing the spaces 341 present in the first protruding portion 340A, the flow of the mixed gas, which has passed through the gap 210 of the motor 200, in the axial direction is not disturbed by the spaces 341 present in the first protruding portion 340A. That is, decreasing of the amount of the mixed gas flowing from the gap 210 of the motor 200 toward the outlet port 113 can be restrained. Thus, decreasing of the amount of the lubricating oil that is contained in the mixed gas discharged from the outlet port 113 can be restrained.

In other words, in the above-described embodiment, the surrounding walls 350, 360, which may also be called "sleeves", preferably at least contact the outer circumferential surface of the protruding portions of the stator coils 340 in order to at least impede the flow of the mixed gas through the spaces 341. More preferably, the surrounding walls (sleeves) 350, 360 substantially contact or even tightly (snugly, flushly) contact the outer circumferential surface of the protruding portions 340A, 340B of the stator coils 340 so that the radially outer sides of the spaces 341 are at least partially, more preferably completely, blocked. Therefore, in further preferred embodiments according to the present disclosure, the surrounding walls 350, 360 tightly (snugly, flushly) contact, and preferably also adhere to, the outer circumferential surface of one or both of the protruding portions 340A, 340B of the stator coils 340 to seal the radially outer sides of the spaces 341 in an air-tight manner. For example, the surrounding walls 350, 360 may be respectively shrink-fitted to the outer circumferential surface of the protruding portions of the stator coils 340, in order to completely block (prevent) any flow of mixed gas through the spaces 341. In such an embodiment, the surrounding walls 350, 360 preferably comprise, e.g., a polyolefin, such as polyethylene or polypropylene, a polyvinyl chloride, a vinyl acetate or combinations thereof. The surrounding walls 350, 360 may be composed of a single mixture (i.e. the composition of the surrounding walls 350, 360 is homogeneous) or the surrounding walls 350, 360 may be composed of layers of different polymers, such as the polymers mentioned above and/or additional polymers.

As shown in FIG. 4, like the first surrounding wall 350, the second surrounding wall 360 is also formed as an annular member 361. The annular member 361 is formed of the same material as the annular member 351.

The shape and size of the annular member 361 forming the second surrounding wall 360 may be the same as or different from the shape and size of the annular member 351 forming the first surrounding wall 350. However, the length of the second surrounding wall 360 in the axial direction is preferably equal to or greater than the length of the second protruding portion 340B in the axial direction, so that the second surrounding wall 360 extends below (beyond) the second protruding portion 350A in the axial direction.

By arranging the annular member 361 on (around) the outer circumferential side of the second protruding portion 340B, the radially outer sides of the spaces 341 present in the second protruding portion 340B are also closed or blocked thereby.

Thus, the flow of the mixed gas into the gap 210 of the motor 200 in the axial direction is not disturbed by the spaces 341 present in the second protruding portion 340B. That is, decreasing of the amount of the mixed gas, that contains lubricating oil, flowing through the gap 210 of the motor 200 can be restrained.

In this embodiment, the first surrounding wall 350 is provided on (around) the outer circumferential side of the first protruding portion 340A and the second surrounding wall 360 is provided on (around) the outer circumferential side of the second protruding portion 340B.

Thus, the flow of mixed gas containing the refrigerant and the lubricating oil in the axial direction can be prevented from being disturbed by the spaces 341 present in the first and second protruding portion 340A, 340B. And, by increasing the amount of lubricating oil that is contained in the mixed gas discharged from the outlet port 113, the amount of the lubricating oil returned from the accumulator 130 is increased.

Furthermore, the first and second protruding portions 340A, 340B can be prevented from coming into contact with other electric components via (through) the spaces 341, which could impair electrical insulation properties of the motor 200. Thus, the first and second surrounding walls 350, 360 may also act as barriers or shields that block, e.g., radially outwardly disposed components from contacting, e.g., the stator coils 310.

Although the surrounding walls are respectively provided on (around) the outer circumferential side of each of the first and second protruding portions 340A, 340B in the present embodiment, only one surrounding wall may be provided on (around) the outer circumferential side of only one of the first and second protruding portions 340A, 340B. In this case, the surrounding wall is preferably provided on (around) the outer circumferential side of the protruding portion on the side from which the power supply connection terminals of each phase are drawn out (extend) (in this embodiment, the first protruding portion 340A).

Figure 6:
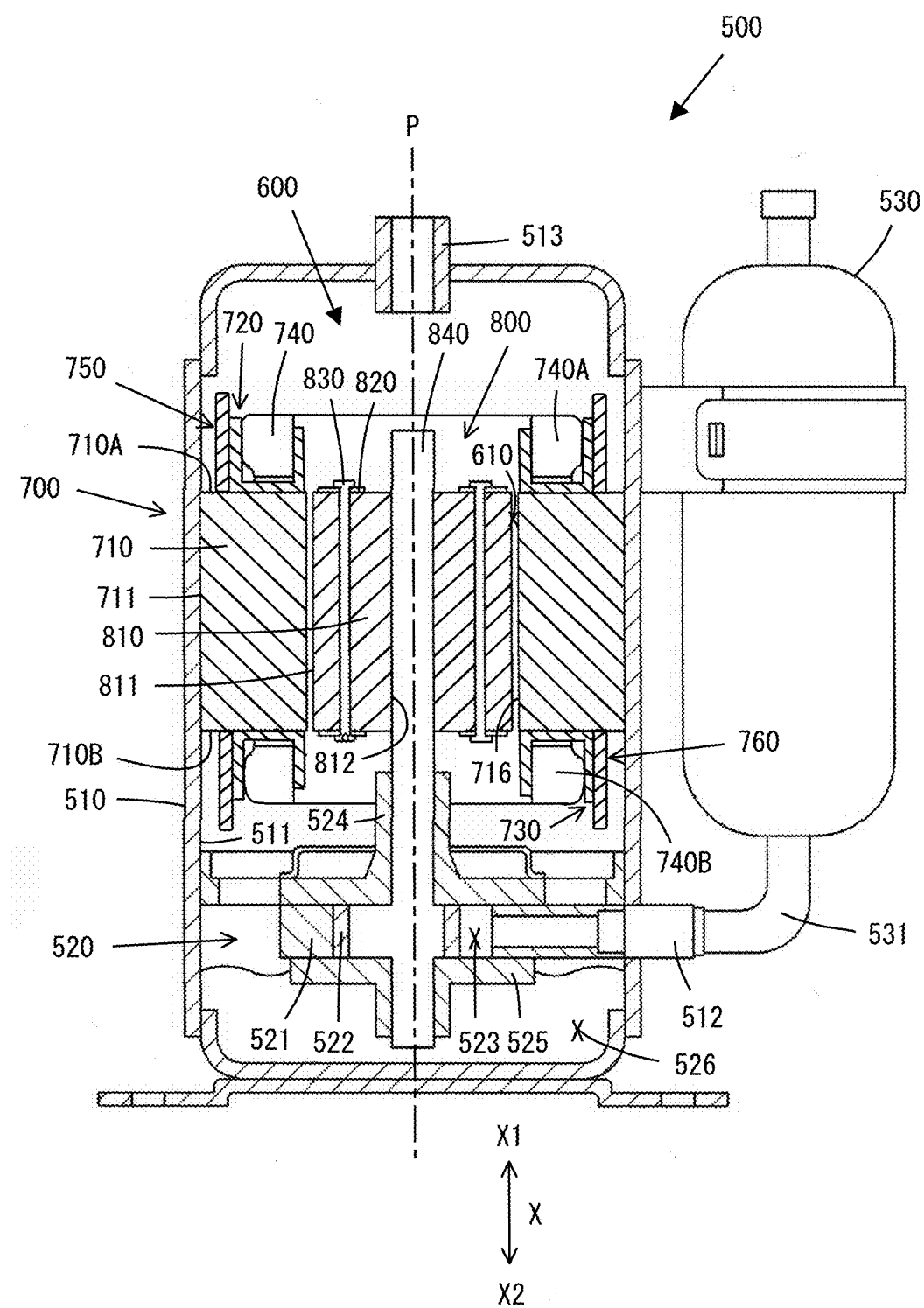
FIG. 6 is a cross-sectional view through a compressor of a second embodiment.

Next, a second embodiment of a compressor according to the present disclosure will be described with reference to FIG. 6. FIG. 6 is a cross-sectional view through a compressor 500 of the second embodiment.

The compressor 500 of the second embodiment includes a motor 600 that serves as a second representative embodiment of a motor according to the present disclosure.

Like the compressor 100 of the first embodiment, the compressor 500 of the second embodiment includes a closed container 510, a compression mechanism part (compressor mechanism) 520, the motor 600 and an accumulator (storage tank) 530.

The closed container 510, the compression mechanism part 520 and the accumulator 530 of the compressor 500 of the second embodiment respectively have the same structures as the closed container 110, the compression mechanism part 120 and the accumulator 130 of the compressor 100 of the first embodiment, and therefore the explanations of them are omitted.

The motor 600 is different from the above-described motor 200 in that stator 700 includes a first electrical insulator assembly 720 and a second electrical insulator assembly 730.

Figure 7:
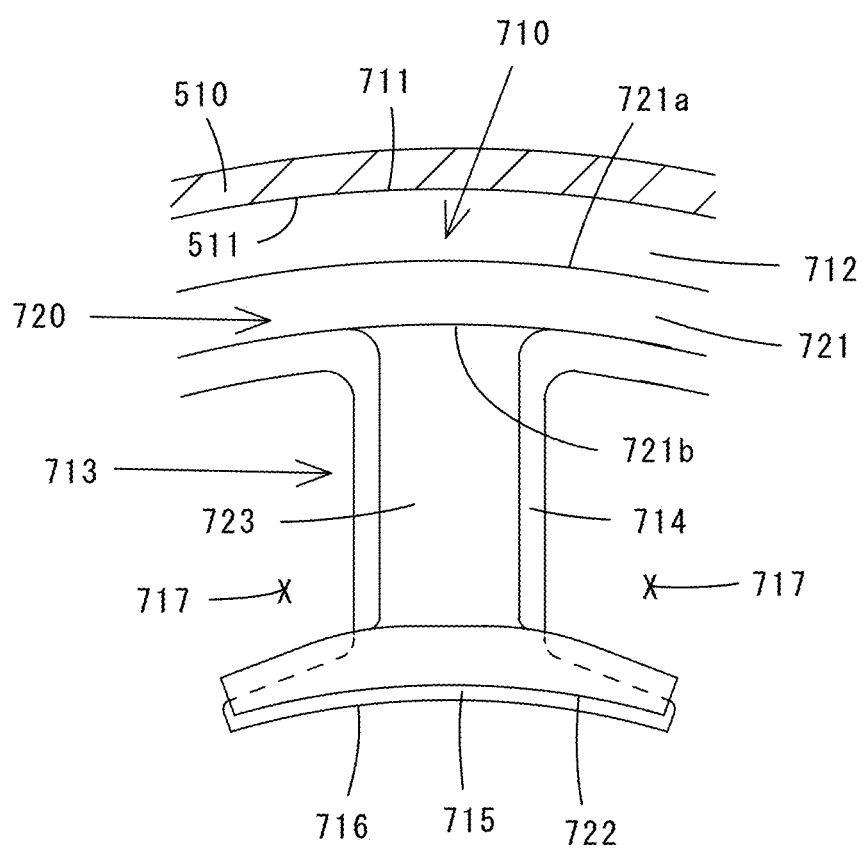
FIG. 7 is an enlarged view of a portion of a stator of the second embodiment.
Figure 8:
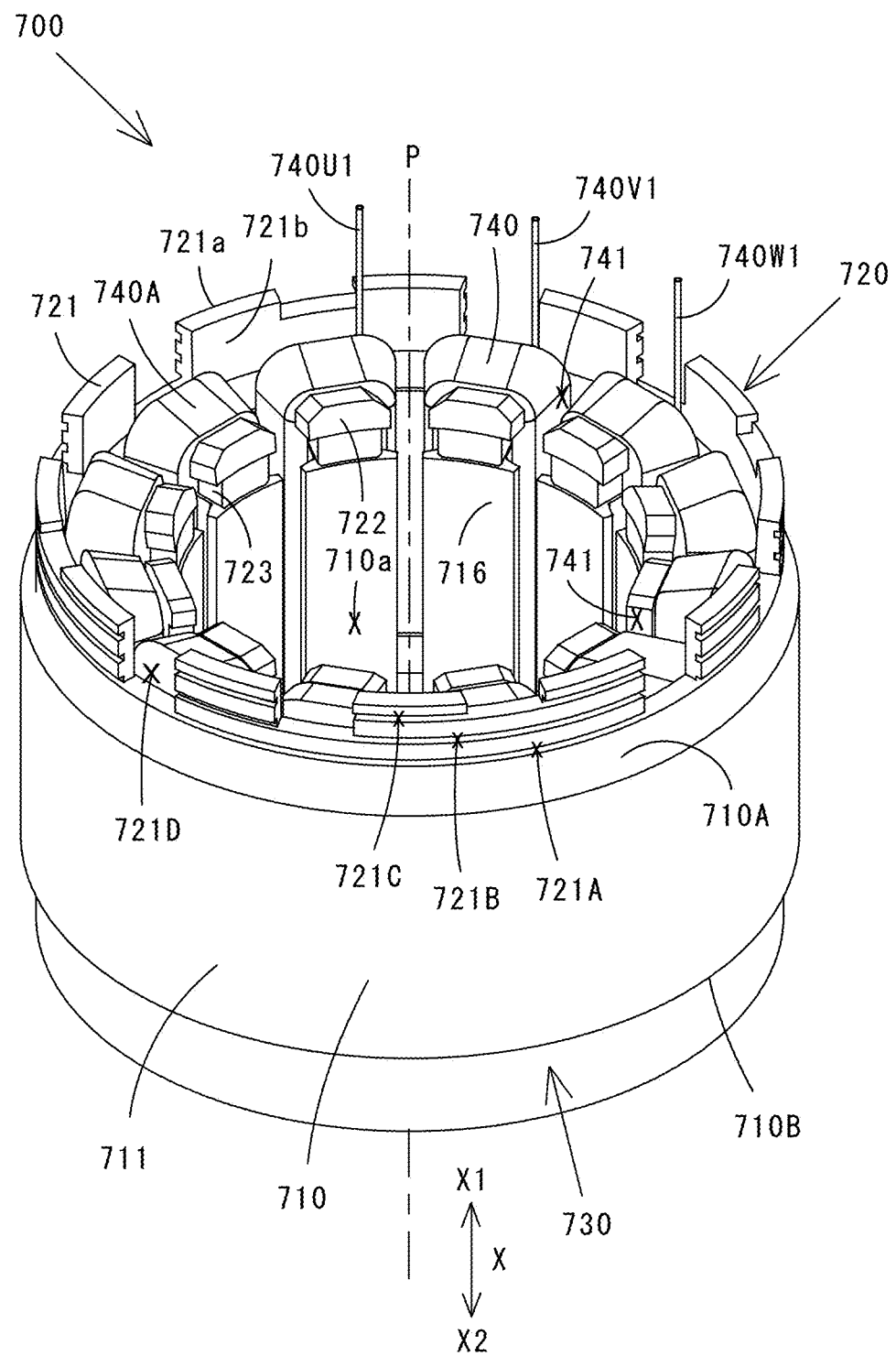
FIG. 8 is a perspective view of the stator of the second embodiment.
Figure 9:
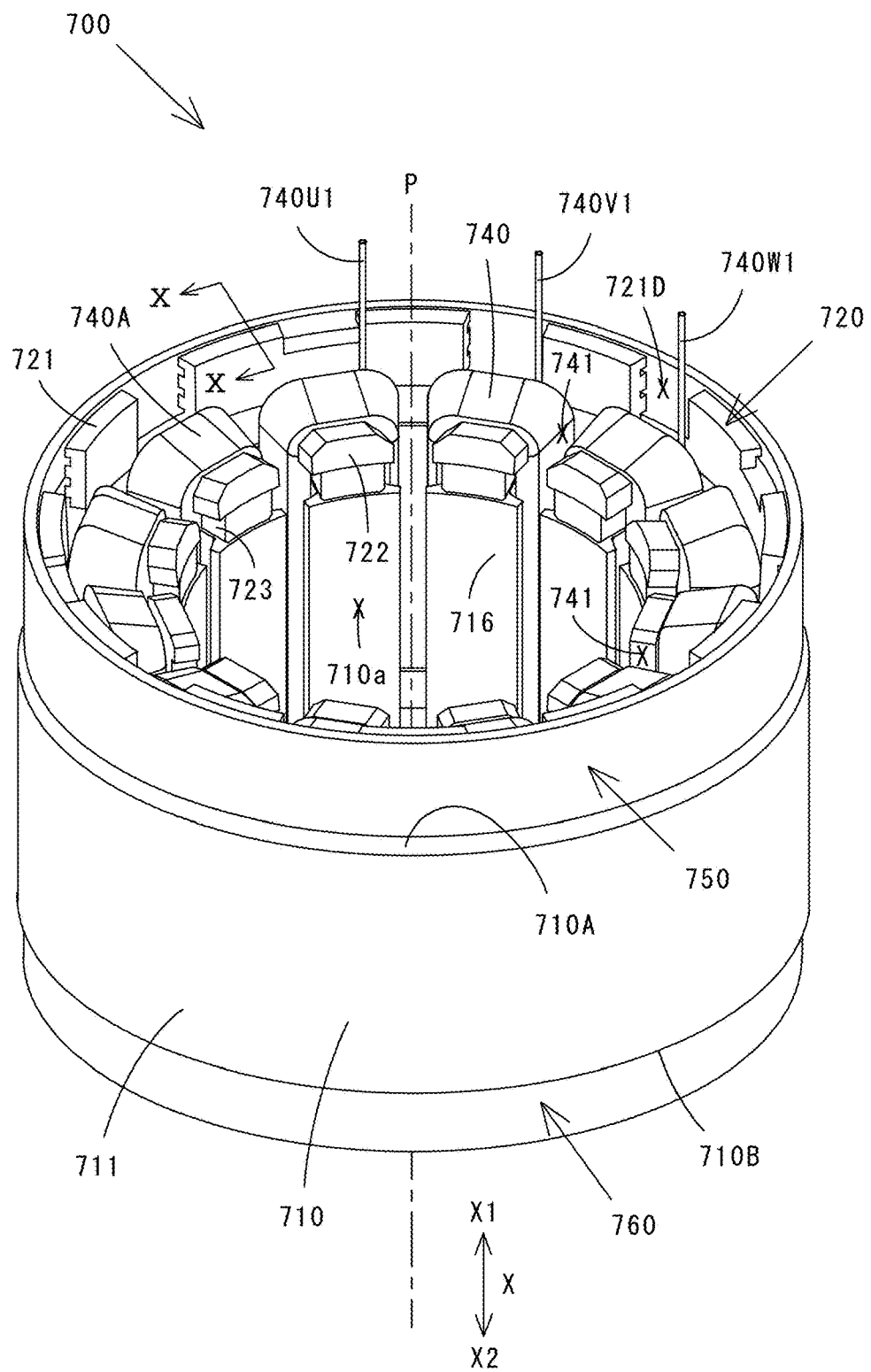
FIG. 9 is another perspective view of the stator of the second embodiment with a surrounding wall of FIG. 4 mounted thereon.
Figure 10:
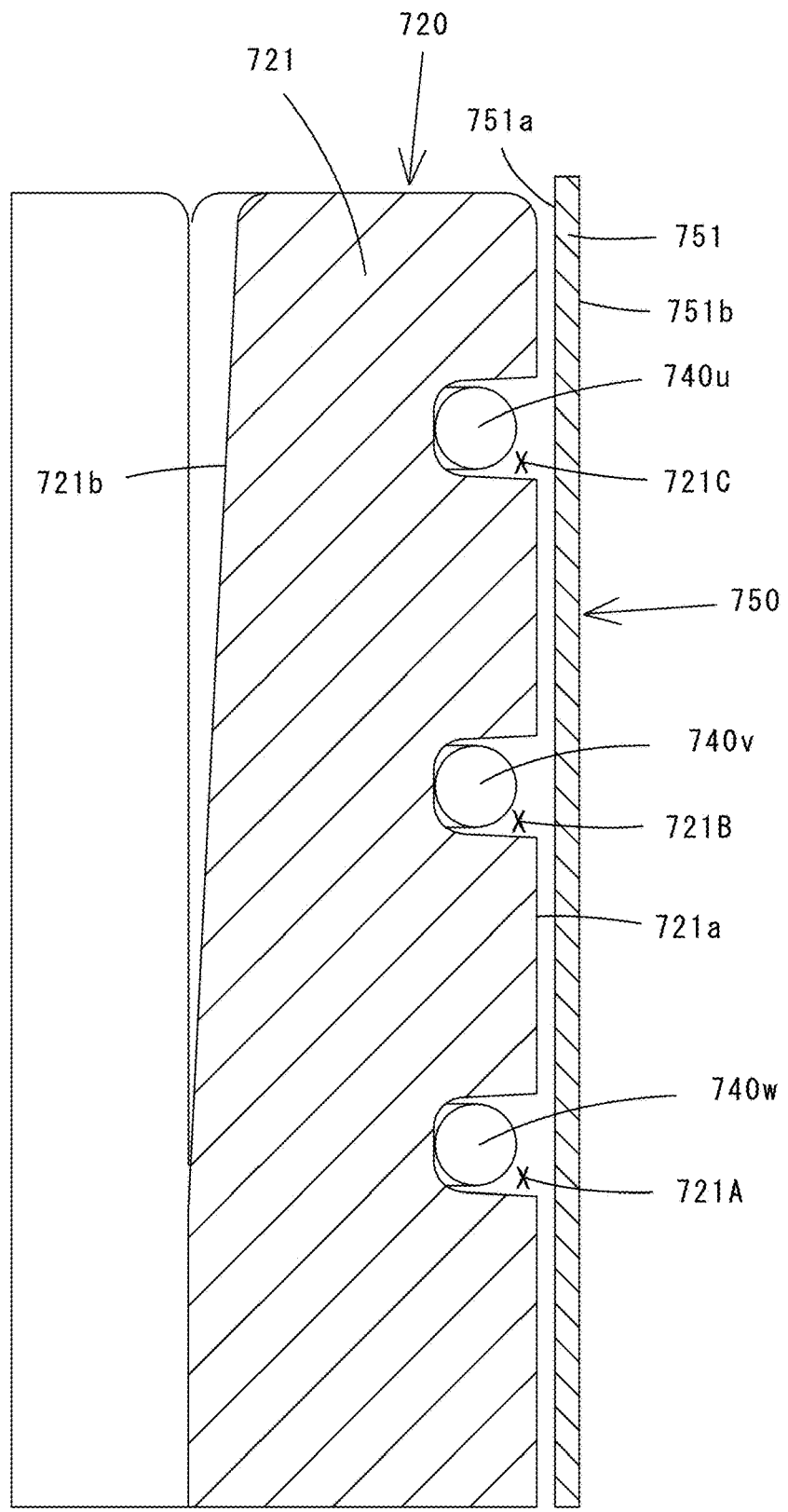
FIG. 10 is a cross-sectional view taken along radially extending line X-X in FIG. 9.

The structure of the motor 600 will now be described in greater detail with reference to FIGS. 7 to 10. FIG. 7 is an enlarged view of a portion of the stator 700 of the motor 600. FIG. 8 is a perspective view of the stator 700 in a state in which first and second surrounding walls 750, 760 are omitted. FIG. 9 is a perspective view of the stator 700 in a state in which the first and second surrounding walls 750, 760 are arranged above and below the stator core 710. FIG. 10 is a sectional view as viewed along radially extending line X-X in FIG. 9.

In this embodiment, a permanent magnet motor is again used as the motor 600.

The motor 600 comprises the stator 700 and a rotor 800.

The rotor 800 has the same structure as the above-described rotor 400 of the motor 200, and therefore the explanation of it is omitted.

The stator 700 includes a stator core 710, a first electrical insulator assembly 720, a second electrical insulator assembly 730 and stator coils 740.

The stator core 710 has the same structure as the above-described stator core 310.

That is, the stator core 710 has a tubular shape extending in the axial direction and has a stator core outer peripheral surface 711 and a stator core inner peripheral surface 716.

The stator core 710 has a stator core end surface 710A on the first side (upper side) in the axial direction, and a stator core end surface 710B on a second side (lower side) in the axial direction.

The stator core 710 has a yoke 712 and teeth 713 as shown in FIG. 7. Each of the teeth 713 has a tooth base part 714 and a tooth tip part 715. The tooth tip part 715 has a tooth tip surface 716. The tooth tip surfaces 716 of the teeth 713 collectively define a stator core inner space.

The stator core 710 is disposed in the closed container inner space with the stator core outer peripheral surface 711 in contact with a closed container inner peripheral surface 511.

The first electrical insulator assembly 720 is formed from a resin (polymer) having insulating properties; preferably the first electrical insulator assembly 720 is composed of an electrically insulating polymer. As shown in FIG. 8, the first electrical insulator assembly 720 has a first outer wall part 721, first inner wall parts 722 and first body parts 723.

The first outer wall part 721 extends in the axial direction and the circumferential direction. The first inner wall parts 722 are arranged radially inward (on the axis P side) of the first outer wall part 721, are spaced apart from each other in the circumferential direction and extend in both the axial direction and the circumferential direction. The first body parts 723 are arranged between the first outer wall part 721 and the first inner wall parts 722 and extend primarily radially.

The first outer wall part 721 has a first outer wall outer peripheral surface 721a and a first outer wall inner peripheral surface 721b.

Grooves 721A to 721C are formed in the first outer wall outer peripheral surface 721a and extend in parallel in the circumferential direction (see FIG. 10). Lead wires 740u, 740v, 740w (referred to as crossover wires) from the U-phase, V-phase and W-phases coils are routed along the first outer wall outer peripheral surface 721a. More specifically, the lead wires 740u, 740v, 740w are respectively inserted (disposed) in the grooves 721A to 721C. Therefore, the grooves 721A to 721C prevent (block) the lead wires 740u, 740v, 740w from coming into contact with each other.

Referring back to FIG. 8, the first outer wall part 721 has notches 721D that open at (extend between) the first outer wall outer peripheral surface 721a and the first outer wall inner peripheral surface 721b. The notches 721D are used to pass the lead wires 740u, 740v, 740w from the inside to the outside or from the outside to the inside of the first outer wall part 721 in the radial direction.

The first electrical insulator assembly 720 is disposed (arranged) on the first side of the stator core 710 (the stator core end surface 710A side) in the axial direction such that the first outer wall part 721, the first body parts 723 and the first inner wall parts 722 respectively face the yoke 712, the tooth base parts 714 and the tooth tip parts 715 of the stator core 710 (see FIG. 7). The first outer wall part 721 and the first body parts 723 may be arranged to face the yoke 712 and the teeth 713, respectively.

Like the first electrical insulator assembly 720, the second electrical insulator assembly 730 has a second outer wall part 731, second inner wall parts 732 and second body parts 733.

The second electrical insulator assembly 730 is (disposed) arranged on the second side of the stator core 710 (the stator core end surface 710B side) in the axial direction such that the second outer wall part (not shown, but having the same shape has first outer wall part 721), the second body parts (not shown, but having the same shape has first body parts 722) and the second inner wall parts (not shown, but having the same shape has first inner wall parts 723) respectively face the yoke 712, the tooth base parts 714 and the tooth tip parts 715 of the stator core 710. The second outer wall part and the second body parts of the second electrical insulator assembly 730 may be arranged to face the yoke 712 and the teeth 713, respectively.

The first electrical insulator assembly 720 may also be used as the second electrical insulator assembly 730.

In an embodiment in which lead wires are not routed along an outer peripheral surface of the second outer wall part on the second side of the stator core 710 in the axial direction, it is possible to omit grooves on the second outer wall outer peripheral surface and notches on the second outer wall part, contrary to the first electrical insulator assembly 720 that has the grooves 721A-C and notches 721D.

The stator coils 740 are respectively wound around the teeth 713 in a state in which the first body parts 723 of the first electrical insulator assembly 720 and the second body parts of the second electrical insulator assembly 730 are respectively arranged on the first and second sides of the teeth 713 in the axial direction.

In this embodiment, the stator coils 740 are wound around the teeth 713 according to a concentrated winding method.

In this embodiment, like in the first embodiment, as shown in FIG. 8, each of the first and second protruding portions 740A, 740B of the stator coil 740 includes spaces 741 that pass through in the radial direction (i.e. radially extending spaces 741) at intervals along the circumferential direction.

Furthermore, the notches 721D are formed in the first outer wall part 721 of the first electrical insulator assembly 720, and notches 731D (not shown) are formed in the second outer wall part 731 of the second electrical insulator assembly 730.

Thus, the spaces 741 present in the first protruding portion 740A and the notches 721D formed on the first outer wall part 721 of the first electrical insulator assembly 720 communicate with each other in the radial direction. Furthermore, spaces (not shown) present in the second protruding portion 740B and the notches formed on the second outer wall part of the second electrical insulator assembly 730 communicate with each other in the radial direction.

If the surrounding walls 750, 760 were (hypothetically) not provided in the present embodiment, the flow of mixed gas in the axial direction would be disturbed by the spaces 741 present in the first protruding portion 740A and the notches 721D formed on the first outer wall part 721 of the first electrical insulator assembly 720 as well as by the spaces present in the second protruding portion 740B and the notches formed on the second outer wall part of the second electrical insulator assembly 730.

However, in the present embodiment, the first surrounding wall 750 is provided on (around) the outer circumferential side of the first outer wall part 721 of the first electrical insulator assembly 720 that is arranged on (around) the outer circumferential side of the first protruding portion 740A. Furthermore, the second surrounding wall 760 is provided on (around) the outer circumferential side of the second outer wall part of the second electrical insulator assembly 730 that is arranged on (around) the outer circumferential side of the second protruding portion 740B.

Like the first and second surrounding walls 350, 360, the first and second surrounding walls 750, 760 are also respectively formed as annular members 751, 761. The annular members 751, 761 are preferably formed of the same types of materials as the annular member 351 as were described above.

By arranging the annular member 751 on (around) the outer circumferential side of the first outer wall part 721 of the first electrical insulator assembly 720, the radially outer sides of the spaces 741 present in the first protruding portion 740A are closed or blocked thereby.

Thus, the flow of mixed gas in the axial direction, which has passed through a gap 610 of the motor 600, can be prevented from being disturbed by the spaces 741 present in the first protruding portion 740A. That is, decreasing of the amount of the mixed gas flowing from the gap 610 toward the outlet port 513 (discharged from the outlet port 513) can be restrained.

Furthermore, by arranging the annular member 761 on (around) the outer circumferential side of the second outer wall part of the second electrical insulator assembly 730, the radially outer sides of the spaces present in the second protruding portion 740B are closed or blocked thereby.

Thus, the flow of mixed gas through the gap 610 of the motor 600 in the axial direction is not disturbed by the spaces present in the second protruding portion 740B. That is, decreasing of the amount of the mixed gas flowing through the gap 610 of the motor 600 can be restrained.

FIG. 10 shows the state in which the first surrounding wall 750 is arranged on (around) the radially outer side of the first outer wall part 721 of the first electrical insulator assembly 720.

As shown in FIG. 10, the first surrounding wall 750 is disposed around the radially outer side of the lead wires 740*u*, 740*v*, 740*w* that have been inserted into (disposed in) the grooves 721A, 721B, 721C formed on the first outer wall outer peripheral surface 721*a* of the first electrical insulator assembly 720. Thus, the lead wires 740*u*, 740*v*, 740*w* can be prevented (blocked) from contacting with other electric components.

Similarly, the second surrounding wall 760 may be disposed around the radially outer side of the lead wires (if present) inserted in the grooves formed on the second outer wall outer peripheral surface of the second electrical insulator assembly 730 for the same purpose.

In this embodiment, the first surrounding wall 750 is provided on (around) the outer radially outer side of the first outer wall part 721 of the first electrical insulator assembly 720, and the second surrounding wall 760 is provided on (around) the outer radially outer side of the second outer wall part of the second electrical insulator assembly 730.

Thus, the flow of mixed gas containing the refrigerant and the lubricating oil in the axial direction is not disturbed by the spaces 741 present in the first protruding portion 740A and the spaces present in the second protruding portion 740B.

Furthermore, the lead wires inserted into the grooves formed on the first outer wall outer peripheral surface 721*a* (and optionally also the second outer wall outer peripheral surface) of the first and second electrical insulator assemblies 720, 730 can be prevented from coming into contact with other electric components, which could impair electrical insulation properties.

Although the surrounding walls 750, 760 are respectively provided on (around) the outer radially outer side of the first outer wall part 721 of the first electrical insulator assembly 720 and on (around) the outer radially outer side of the second outer wall part of the second electrical insulator assembly 730 of the present embodiment, a surrounding wall may be provided on (around) the outer radially outer side of only one of the first and second outer wall parts. In this case, the surrounding wall is preferably provided on (around) the outer radially outer side of the protruding portion on the side from which the power supply connection terminals of each phase are drawn out (extend) (in this embodiment, the first outer wall part 721 of the first electrical insulator assembly 720).

The compressor of this disclosure can be used for various applications.

For example, it can be used in an air conditioner. The air conditioner may be, e.g., an air conditioner for home use, an air conditioner for business use or a vehicle air conditioner.

Air conditioners for home use may be used, e.g., in detached or attached houses or in apartment buildings (multiple dwelling buildings).

Air conditioners for business use may be used in an office building or a shop.

Vehicle air conditioners may be used in a vehicle, such as ecologically-friendly cars, such as an electric vehicle (EV), a hybrid vehicle (HV) and a fuel cell vehicle (FCV), which reduces the amount of exhaust gas that is discharged.

Additional non-limiting embodiments of the present teachings include, but are not limited to:

(Aspect 1) A motor including a stator and a rotor,
the stator includes a stator core and stator coils,
the stator core has a tubular shape extending in an axial direction, the stator core having a yoke extending in a circumferential direction and teeth arranged spaced apart from each other in the circumferential direction and extending radially inward from the yoke,
the stator coils are respectively wound around the teeth, wherein:
each of the stator coils includes first and second protruding portions that respectively protrude from the stator core toward first and second sides in the axial direction; and
a surrounding wall is provided on (around) an outer circumferential side of at least one of the first and second protruding portions and extends continuously in the axial direction and the circumferential direction so as to surround the entire outer circumferential side of the at least one of the first and second protruding portions.

(Aspect 2) The motor as defined in above Aspect 1, wherein:
the stator includes a first electrical insulator assembly and a second electrical insulator assembly,
the first electrical insulator assembly has a first outer wall part that extends in the axial direction and the circumferential direction, and first body parts that are arranged spaced apart from each other in the circumferential direction and extend radially inward from the first outer wall part, the first electrical insulator assembly being arranged (disposed) on (around) the first side of the stator core in the axial direction such that the first outer wall part faces the yoke and the first body parts respectively face the teeth,
the second electrical insulator assembly has a second outer wall part that extends in the axial direction and the circumferential direction, and second body parts that are arranged spaced apart from each other in the circumferential direction and extend radially inward from the second outer wall part, the second electrical insulator assembly being arranged (disposed) on (around) the second side of the stator core in the axial direction such that the second outer wall part faces the yoke and the second body parts respectively face the teeth,
the stator coils are respectively wound around the teeth in a state in which the first and second body parts are respectively arranged on the first and second sides of the teeth in the axial direction,
at least one of the first outer wall part and the second outer wall part has at least one notch that opens at (extends between) an outer wall outer peripheral surface and an outer wall inner peripheral surface, and
the surrounding wall is provided on (around) an outer circumferential side of the at least one of the first and second outer wall parts.

(Aspect 3) The motor as defined in above Aspect 1 or 2, wherein the surrounding wall comprises an annular member formed from a heat shrinkable resin (i.e. the annular member is composed of a heat shrinkable polymer).

(Aspect 4) A compressor comprising a compression mechanism part, a motor that drives the compression mechanism part, and a closed container in which the compression mechanism part and the motor are housed, the closed container including an inlet port and an outlet port and having an oil sump provided therein to store lubricating oil, the compressor being configured such that a refrigerant suctioned from the inlet port is compressed by the compression mechanism part and discharged from the outlet port,
wherein:
the motor comprises the motor as defined in any one of above Aspects 1 to 3.

(Aspect 5) The compressor as defined in above Aspect 4, wherein:
the motor is arranged such that the axial direction is parallel to a vertical direction,
the motor and the compression mechanism part are arranged such that one of them is disposed above the other in the vertical direction, and
the oil sump is provided below the compression mechanism part.

(Aspect 6) The compressor as defined in above Aspect 5, wherein:
the motor is arranged above the compression mechanism part,
the first protruding portion protrudes upward from the stator core,
the second protruding portion protrudes downward from the stator core, and
the surrounding wall is provided on (around) an outer circumferential side of at least one of the first and second protruding portions.

(Aspect 7) An air conditioner having a compressor, wherein:
the compressor comprises the compressor as defined in any one of above Aspects 4 to 6.

The present disclosure is not limited to the structures described in the embodiment, but rather, may be added to, changed, replaced with alternatives or otherwise modified.

In the embodiments described above, vertical compressors were described in which a motor is arranged (disposed) above a compression mechanism part. However, compressors according to the present disclosure may instead be configured as a vertical compressor in which a motor is arranged (disposed) below a compression mechanism part.

In addition, compressors according the present disclosure also may be configured as a horizontal compressor in which a motor and a compression mechanism part are arranged side by side in a horizontal direction (or a substantially horizontal direction).

Compression mechanism parts having various structures can be used as the compression mechanism part, as was mentioned above.

Motors having a stator and a rotor and having various structures can be used as the motor for driving the compression mechanism part.

The above described embodiments include a stator core having teeth, each of which includes a tooth base part and a tooth tip part, but a stator core having teeth that each include only a tooth base part may be used. In such modified embodiments, a first electrical insulator assembly (a second electrical insulator assembly) having an outer wall part and body parts may be used.

The shape and material of the surrounding wall may be appropriately changed.

Any of the features or structures described in the embodiment may be used individually or in combination of appropriately selected ones.

DESCRIPTION OF THE REFERENCE NUMERALS

100, 500: compressor, 110, 510: closed container, 111, 511: closed container inner peripheral surface, 112, 512: inlet port, 113, 513: outlet port, 120, 520: compression mechanism part, 121, 521: cylinder, 122, 522: eccentric rotor, 123, 523: compression chamber, 124, 125, 524, 525: bearing, 126, 526: oil sump, 130, 530: accumulator, 131, 531: suction pipe, 200, 600: motor, 300, 700: stator, 310, 710: stator core, 310A, 310B, 710A, 710B: stator core end surface, 310a, 710a: stator core inner space, 311, 711: stator core outer peripheral surface, 312, 712: yoke, 313, 713: tooth, 314, 714: tooth base part, 315, 715: tooth tip part, 316, 716: tooth tip surface, 317, 717: slot, 340, 740: stator coil, 340A, 340B, 740A, 740B: protruding portion, 340U1, 340V1, 340W1, 740U1, 740V1, 740W1: power supply connection terminal, 341, 741: space, 350, 360, 750, 760: surrounding wall, 350a, 360a, 750a, 760a: annular member inner space, 351, 361, 751, 761: annular member, 351a, 361a, 751a, 761a: annular member inner peripheral surface, 351b, 361b, 751b, 761b: annular member outer peripheral surface, 400: rotor, 410: rotor core, 420: end plate, 430: caulking pin, 440: rotary shaft, 720, 730: electrical insulator assembly, 721: outer wall part, 721a: outer wall outer peripheral surface, 721b: inner wall outer peripheral surface, 722: inner wall part, 723: body part, 721A, 721B, 721C: groove,

The invention claimed is:

1. A motor comprising a rotor, a stator and at least one surrounding wall, wherein:
the stator includes a stator core and stator coils,
the stator core has a tubular shape extending in an axial direction, the stator core including a yoke extending in a circumferential direction and teeth arranged spaced apart from each other in the circumferential direction and extending radially inward from the yoke,
the stator coils are respectively wound around the teeth,
each of the stator coils includes a first protruding portion and a second protruding portion that respectively protrude from the stator core toward a first side and a second side in the axial direction; and
the at least one surrounding wall is disposed around an outer circumferential side of at least one of the first protruding portions and the second protruding portions, and extends continuously in the axial direction and the circumferential direction so as to surround the entire outer circumferential side of the at least one of the first protruding portions and the second protruding portions.

2. The motor as defined in claim 1, wherein:
the stator includes a first electrical insulator assembly and a second electrical insulator assembly,
the first electrical insulator assembly has a first outer wall part that extends in the axial direction and the circumferential direction, and first body parts that are arranged spaced apart from each other in the circumferential direction and extend radially inward from the first outer wall part, the first electrical insulator assembly being disposed on the first side of the stator core in the axial direction such that the first outer wall part faces the yoke and the first body parts respectively face the teeth,
the second electrical insulator assembly has a second outer wall part that extends in the axial direction and the circumferential direction, and second body parts that are arranged spaced apart from each other in the circumferential direction and extend radially inward from the second outer wall part, the second electrical insulator assembly being disposed on the second side of the stator core in the axial direction such that the second outer wall part faces the yoke and the second body parts respectively face the teeth, the stator coils are respectively wound around the teeth in a state in which the first body parts and the second body parts are respectively arranged on the first side and the second side of the teeth in the axial direction, at least one of the first outer wall part and the second outer wall part has at least one notch that extends between an outer wall outer peripheral surface and an outer wall inner peripheral surface, and the at least one surrounding wall is disposed around an outer circumferential side of the least one of the first outer wall part and the second outer wall part.

3. The motor as defined in claim 1, wherein the surrounding wall comprises an annular member composed of a heat shrinkable polymer.

4. A compressor comprising:
a compression mechanism part,
the motor as defined in claim 1 and configured to drive the compression mechanism part, and
a closed container in which the compression mechanism part and the motor are housed, the closed container including an inlet port and an outlet port and having an oil sump provided therein to store lubricating oil, the compressor being configured such that a refrigerant suctioned from the inlet port is compressed by the compression mechanism part and discharged from the outlet port.

5. The compressor as defined in claim 4, wherein:
the motor is arranged such that the axial direction is parallel to a vertical direction,
the motor and the compression mechanism part are arranged such that one of the motor and the compression mechanism part is disposed above the other in the vertical direction, and
the oil sump is provided below the compression mechanism part.

6. The compressor as defined in claim 5, wherein:
the motor is arranged above the compression mechanism part,
the first protruding portion protrudes upward from the stator core in the vertical direction,
the second protruding portion protrudes downward from the stator core in the vertical direction, and
the at least one surrounding wall is disposed around at least an outer circumferential side of the first protruding portion.

7. The compressor as defined in claim 4, wherein the surrounding wall comprises an annular member composed of a heat shrinkable polymer.

8. An air conditioner comprising the compressor as defined in claim 4.

9. A motor comprising:
a stator core having a tubular shape, the stator core including a yoke extending in a circumferential direction and teeth arranged spaced apart from each other in the circumferential direction and extending radially inward from the yoke,
coils respectively wound around the teeth, each of the stator coils having a first protruding portion that protrudes out of the stator core in a first axial direction and a second protruding portion that protrudes out of the stator core in a second axial direction that is opposite of the first axial direction,
a rotor rotatably disposed within the stator core, and a first surrounding wall that completely surrounds outer circumferential sides of the first protruding portions of the coils and block radially outer sides of radially extending spaces present in the first protruding portions of the coils.

10. The motor as defined in claim 9, wherein the first surrounding wall has a length in the axial direction that is at least as long as the axial length of the first protruding portions of the coils.

11. The motor as defined in claim 9, further comprising:
a second surrounding wall that completely surrounds entire outer circumferential sides of the second protruding portions and blocks radially outer sides of radially extending spaces present in the second protruding portions.

12. The motor as defined in claim 11, wherein the second surrounding wall has a length in the axial direction that is at least as long as the axial length of the second protruding portions of the coils.

13. The motor as defined in claim 12, wherein the first surrounding wall has a length in the axial direction that is at least as long as the length of the first protruding portions of the coils.

14. The motor as defined in claim 13, wherein each of the first and second surrounding walls is an annular member composed of an electrically insulating polymer.

15. The motor as defined in claim 14, wherein each of the electrically insulating polymers is heat shrinkable.

16. The motor as defined in claim 9, wherein:
the stator includes a first electrical insulator assembly and a second electrical insulator assembly,
the first electrical insulator assembly has a first outer wall part that extends in the axial direction and the circumferential direction, and first body parts that are arranged spaced apart from each other in the circumferential direction and extend radially inward from the first outer wall part,
the second electrical insulator assembly has a second outer wall part that extends in the axial direction and the circumferential direction, and second body parts that are arranged spaced apart from each other in the circumferential direction and extend radially inward from the second outer wall part,
the first electrical insulator assembly is disposed on a first side of the stator core in the axial direction such that the first outer wall part faces the yoke and the first body parts respectively face the teeth, and
the second electrical insulator assembly is disposed on a second side of the stator core in the axial direction such that the second outer wall part faces the yoke and the second body parts respectively face the teeth.

17. The motor as defined in claim 16, wherein:
the stator coils are respectively wound around the teeth in a state in which the first body parts and the second body parts are respectively arranged on a first side and a second side of the teeth in the axial direction,
the first outer wall part has at least one notch that extends between an outer wall outer peripheral surface and an outer wall inner peripheral surface, and
the first surrounding wall is disposed around an outer circumferential side of the first outer wall part.

18. The motor as defined in claim 17, further comprising:
a second surrounding wall that completely surrounds outer circumferential sides of the second protruding portions and blocks radially outer sides of radially extending spaces present in the second protruding portions, the second surrounding wall also surrounding an outer circumferential side of the second outer wall part.

19. The motor as defined in claim 18, wherein:

the first surrounding wall has a length in the axial direction that is at least as long as the length of the first protruding portions of the coils, and the second surrounding wall has a length in the axial direction that is at least as long as the axial length of the second protruding portions of the coils.

20. The motor as defined in claim 19, wherein each of the first and second surrounding walls is a shrink wrapped polymer sleeve that tightly contacts and adheres to the outer circumferential surface of the respective first and second protruding portions and seals the radially outer sides of the radially extending spaces in an air-tight manner.

* * * * *